O. ZWIETUSCH.
Soda-Water Draft-Tubes.
No. 144,646. Patented Nov. 18, 1873.
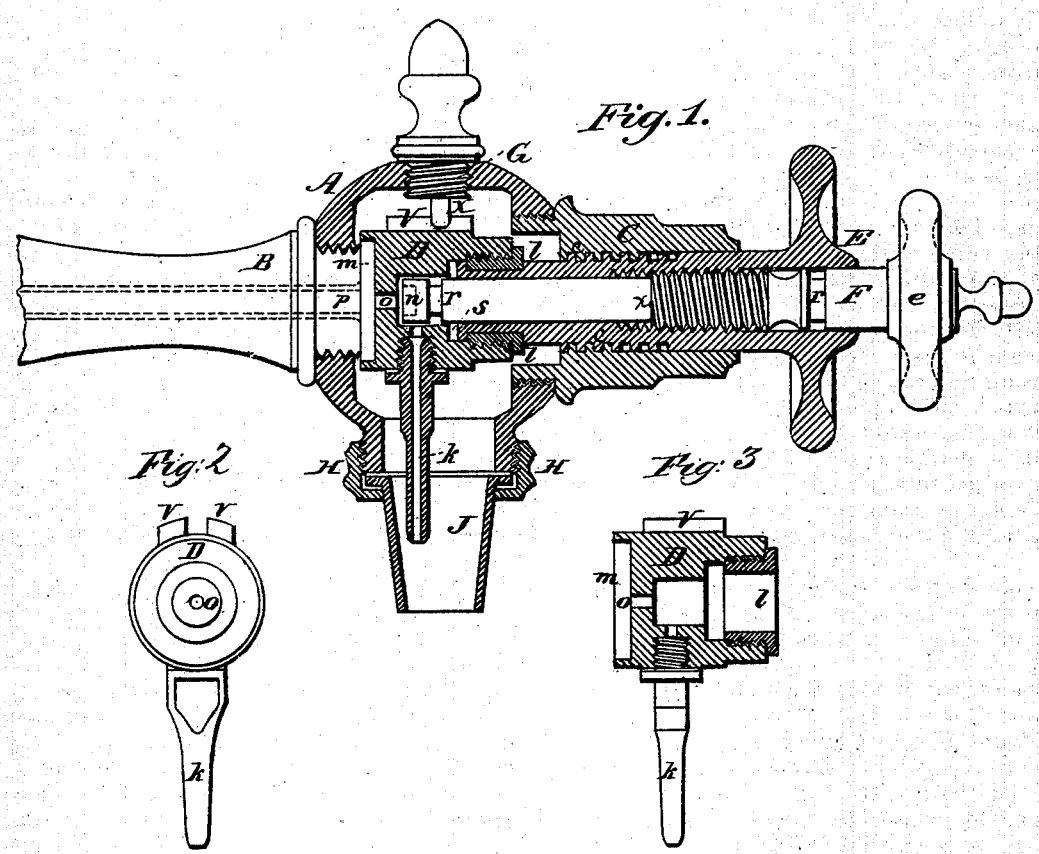
Witnesses.
John G. Hirsch
Jones Jones
Inventor.
Otto Zwietusch

UNITED STATES PATENT OFFICE.

OTTO ZWIETUSCH, OF MILWAUKEE, WISCONSIN.

IMPROVEMENT IN SODA-WATER DRAFT-TUBES.

Specification forming part of Letters Patent No. 144,646, dated November 18, 1873; application filed May 5, 1873.

*To all whom it may concern:*

Be it known that I, OTTO ZWIETUSCH, of Milwaukee, in the State of Wisconsin, have invented a new and Improved Soda-Water Draft-Tube, of which the following is a clear, full, and exact description, reference being had to the accompanying drawings making a part of the specification, in which—

Figure 1 is a longitudinal vertical section. Fig. 2 is a detached view of the shiftable valve-seat and valve. Fig. 3 is a vertical sectional view of the shiftable valve-seat and valve.

My invention relates to that class of valves peculiarly adapted to soda-water draft-tubes in which it is desirable to produce, first, a very fine strong flow of the liquid to mix the sirups; and, next, a full rapid flow, so as to secure a supply of gas; and it consists in the arrangement of a double valve-seat and a shiftable valve, worked by one screw within another, by which a fine stream or a large one may be drawn, and either one first, as may be desired.

To enable others skilled in the art to make and use my invention, I will proceed to describe the exact manner in which I have carried it out.

In the drawings, A is the body of the draft-tube, and B the stem by which it is attached to the fountain. C is a block screw-guide and screw-nut. D is the shiftable valve, controlled by the large wheel E with its screw $c$. By means of this wheel and screw the large opening P is worked. The wheel $e$ controls the small interior screw $x$ for opening and closing the small outlet $o$, which, when the small screw $x$ is withdrawn, communicates with the opening in the nozzle $k$ introduced through the large nozzle J, which, in turn, is secured in position by the screw-nut H. The nozzle J is usually made of glass; but it may be made of any other suitable material. The valve D is secured in position by the two half-screws $l$; and these half-screws serve as guides to the shiftable valve. At the large opening I place the packing $m$, and at the small opening the packing $n$. Around the rod controlled by the small wheel $e$ is the groove $r$, to receive a suitable packing; and $s$ is the packing-seat for the small chamber. G is a guide for the valve-seat, and works in the groove V.

From this description of the construction of my improved soda-water draft-tube its operation must be simple. By a partial revolution of the small wheel $e$ the end of the rod holding the packing $n$ is drawn out beyond the opening in the nozzle $k$, and a fine strong stream is permitted to flow. When the sirup in the glass has been sufficiently mixed, a movement of the large wheel E opens the large valve by withdrawing the packing $m$ from its position against the large outlet P, and permits a full flow of the soda through the large nozzle J.

If a full flow of soda only be desired, my tub allows this to be done without opening the small valve. In this my tube possesses a great advantage.

Having thus described my invention and its manner of working, what I claim as new, and desire to secure by Letters Patent, is—

The valve $n$, having its seat over the opening $o$ in the valve D, and having a positive motion from the screw $x$, in combination with the valve D and screw $c$, so that I am enabled either to open or close the viaducts $o$ $p$ singly or both together, as set forth.

OTTO ZWIETUSCH.

Witnesses:
JOHN G. HIRSCH,
JAMES JONES.